United States Patent
Kavosh et al.

(10) Patent No.: US 9,412,420 B2
(45) Date of Patent: Aug. 9, 2016

(54) HERMETICALLY SEALING A DISK DRIVE ASSEMBLY

(71) Applicant: HGST Netherlands B.V., Amsterdam (NL)

(72) Inventors: Iraj Kavosh, San Jose, CA (US); Kirk B. Price, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 840 days.

(21) Appl. No.: 13/684,509

(22) Filed: Nov. 24, 2012

(65) Prior Publication Data

US 2013/0074323 A1 Mar. 28, 2013

Related U.S. Application Data

(62) Division of application No. 11/732,683, filed on Apr. 3, 2007, now Pat. No. 8,335,050.

(51) Int. Cl.
*G11B 33/14* (2006.01)
*G11B 33/02* (2006.01)
*G11B 25/04* (2006.01)

(52) U.S. Cl.
CPC .......... *G11B 33/1466* (2013.01); *G11B 33/022* (2013.01); *G11B 33/1446* (2013.01); *G11B 25/043* (2013.01); *Y10T 29/49025* (2015.01)

(58) Field of Classification Search
CPC .......... G11B 33/1446; G11B 33/1466; G11B 33/022; H05K 5/066; Y10T 29/49025
See application file for complete search history.

(56) References Cited

U.S. PATENT DOCUMENTS

| | | | |
|---|---|---|---|
| 3,419,953 A | 1/1969 | Diemen et al. | |
| 4,521,668 A | 6/1985 | Osial et al. | |
| 4,960,973 A | 10/1990 | Fouche et al. | |
| 5,250,782 A | 10/1993 | Cordelle et al. | |
| 5,275,328 A | 1/1994 | Lodge et al. | |
| 5,879,416 A | 3/1999 | Nakamura et al. | |
| 6,821,032 B2 | 11/2004 | Lake et al. | |
| 2003/0179489 A1 | 9/2003 | Bernett et al. | |
| 2003/0223148 A1 | 12/2003 | Macleod et al. | |
| 2005/0068666 A1 | 3/2005 | Albrecht et al. | |
| 2005/0173870 A1* | 8/2005 | Gunderson | F16J 15/0806 277/628 |
| 2005/0184463 A1* | 8/2005 | Boutaghou | G11B 33/1466 277/316 |
| 2006/0002067 A1 | 1/2006 | Gunderson et al. | |
| 2006/0050429 A1 | 3/2006 | Gunderson et al. | |

FOREIGN PATENT DOCUMENTS

| | | |
|---|---|---|
| EP | 117352 | 9/1984 |
| EP | 0614329 | 9/1994 |
| GB | 2279492 | 1/1995 |
| JP | 59019090 | 1/1984 |
| JP | 59130447 | 7/1984 |
| JP | 61114597 | 7/1986 |
| JP | 1122685 | 5/1989 |
| JP | 3126248 | 5/1991 |
| JP | 5062446 | 3/1993 |
| JP | 5325531 | 12/1993 |
| JP | 8161881 | 6/1996 |
| JP | 9172102 | 6/1997 |
| JP | 2004172206 | 6/2004 |

* cited by examiner

*Primary Examiner* — Livius R Cazan

(57) ABSTRACT

A method for forming a seal for hermetically sealing a hard disk drive assembly. The method includes forming a solder channel within a top cover of a disk drive enclosure and disposing a solder preform on a base of the disk drive enclosure such that the solder preform aligns with the solder channel when the top cover is positioned on the base.

14 Claims, 6 Drawing Sheets

HERMETICALLY SEALING A DISK DRIVE ASSEMBLY

RELATED APPLICATIONS

This application is a divisional of U.S. patent application Ser. No. 11/732,683, now U.S. Pat. No. 8,335,050, filed on Apr. 3, 2007 entitled "A DISK DRIVE WITH A SOLDER PREFORM HERMETIC SEAL," by Kavosh et al., and assigned to the assignee of the present application.

TECHNICAL FIELD

The field of the present invention relates to disk drive data storage devices. More particularly, embodiments of the present invention are related to sealing a disk drive assembly.

BACKGROUND ART

Disk drives are used in many electronic devices such as laptops, MP3 players, GPS, PDA devices and other devices. Controlling the environment inside the disk drive assembly is a key component of these drives. One of the requirements of these drives includes sealing the drive from outside environment conditions.

For example, sealing the disk drive from the outside environment prevents contaminates such as dust and moisture from entering the disk drive. Furthermore, some disk drives are filled with a media such as argon to prevent oxidation and improve performance of the disk drive assembly.

One downside of sealing the disk drive assembly is that re-work becomes more difficult because the drive must be un-sealed prior to being able to service the drive.

SUMMARY OF THE INVENTION

A method for forming a seal for hermetically sealing a hard disk drive assembly is disclosed. The method includes forming a solder channel within a top cover of a disk drive enclosure and disposing a solder preform on a base of the disk drive enclosure such that the solder preform aligns with the solder channel when the top cover is positioned on the base.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
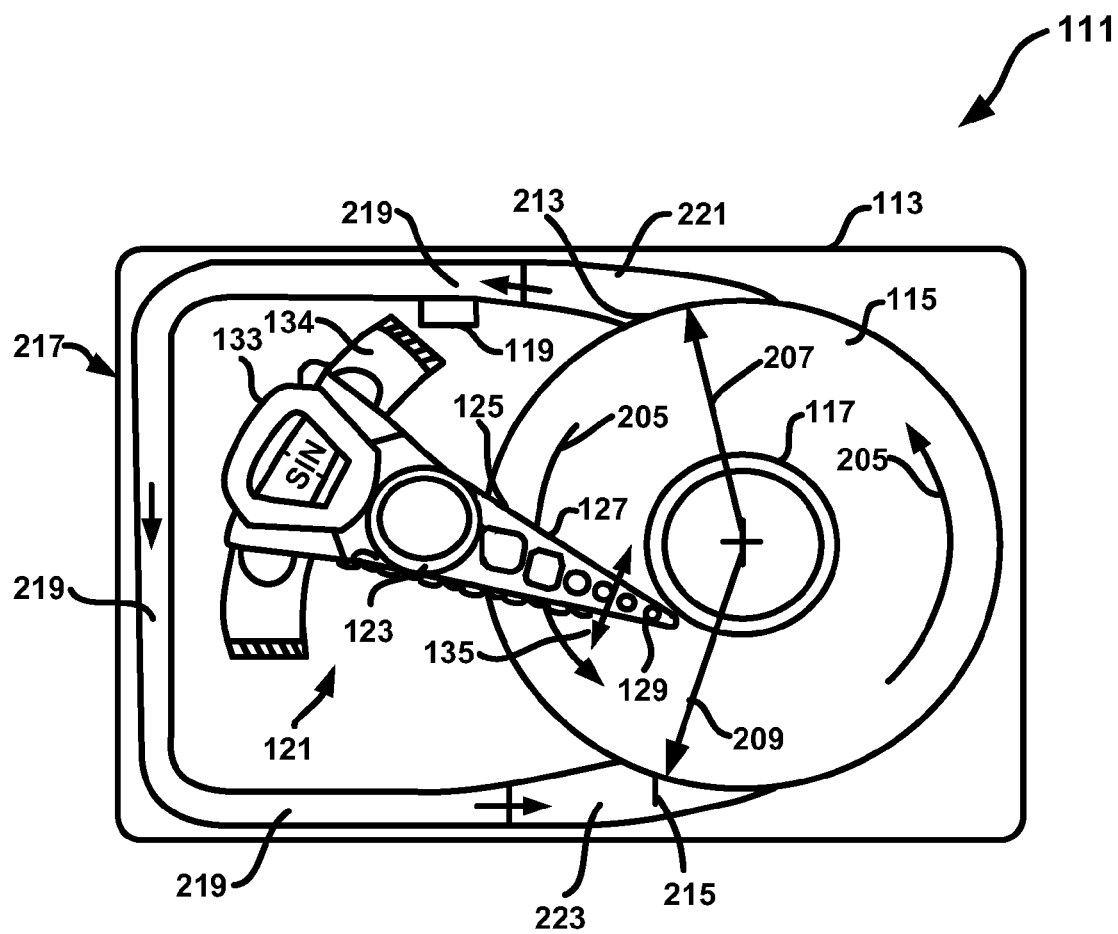
FIG. 1 is a schematic, top plan view of a hard disk drive in accordance with one embodiment of the present invention.

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a system and method for sealing components of a hard disk drive. Specifically, the discussion will then focus on embodiments of this invention that provide a system and method for hermetically sealing a hard disk drive using a soldering process. In one embodiment, a solder seal is disposed between the top cover and base casting of the hard disk drive enclosure. In one embodiment, the solder seal hermetically seals the hard disk drive assembly without requiring welding or melting of the top cover or the base.

Although embodiments of the present invention will be described in conjunction with a hard disk drive solder seal and sealing process, it is understood that the embodiments described herein are useful outside of the art of disk drive assemblies, such as devices requiring hermetic sealing.

The utilization of a solder seal is only one embodiment and is provided herein merely for purposes of brevity and clarity. It is appreciated that the present invention uses a material for sealing the disk drive assembly that melts at a lower temperature than the top portion or the base portion of the disk drive enclosure. In one embodiment, the solder is applied to the disk drive enclosure as a solder preform. A solder preform is a segment of solder that can be aligned around the perimeter of the top cover and/or the base of a hard disk drive prior to assembly. The solder seal (solder preform) is melted and re-flowed to (solder) seal the disk drive assembly without melting and/or welding the top cover or the base material. By using a solder preform, the disk drive assembly can be more easily re-opened after sealing to allow re-work. Furthermore, the utilization of a laser to re-flow the solder seal is provided herein merely for purposes of brevity and clarity. It is appreciated that the present invention uses a laser for heating the solder seal, however, it is appreciated that many other methods for heating the solder seal could be used.

Overview

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 (load beam removed). It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer.

The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127

ELS 127 has a spring-like quality, which biases or presses the air-bearing surface of the slider 129 against the disk 115 to cause the slider 129 to fly at a precise distance from the disk. The ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies.

Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

Embodiments of the present invention include a solder seal and solder process for joining a base portion of a disk drive enclosure to a top cover of a disk drive enclosure. In one embodiment, the solder seal hermetically seals the disk drive assembly, meaning the environment inside the disk drive assembly is controllable and separate from the environment outside the disk drive assembly.

Embodiments of the present invention include depositing a solder seal (preform) to one or more components of a hard disk drive assembly, containing the solder seal within a solder channel, achieving a uniform solder joint around the perimeter of the disk drive assembly and maintaining localized, low temperature heating of the solder seal. It is appreciated that embodiments of the present invention hermetically seal a hard disk drive assembly without melting and/or welding the disk drive assembly. By not welding the components of the hard disk drive, the components can be later disassembled. In addition, by not melting and/or welding the disk drive components, heat related damage to the disk drive components is reduced.

Figure 2:
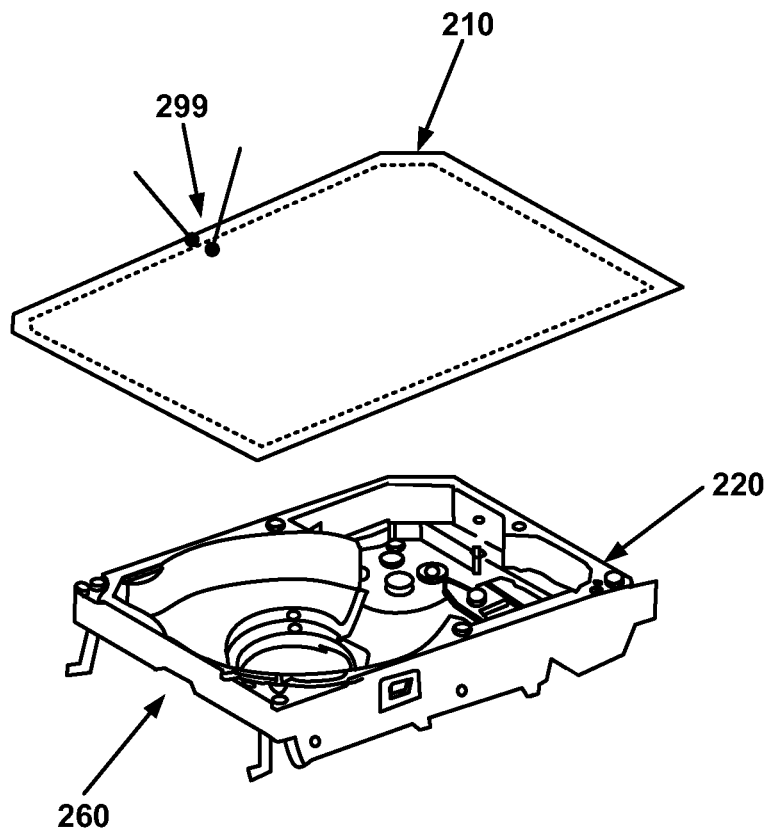
FIG. 2 is an illustration of a disk drive assembly including a top cover and a base in accordance with embodiments of the present invention.

FIG. 2 is an illustration of a disk drive assembly including a top cover 210 and a base 260 in accordance with embodiments of the present invention. In one embodiment of the invention, a solder preform seal 220 is positioned on the base 260 and is then subsequently re-flowed once the top cover 210 is positioned on the base 260 to seal (solder) the top cover 210 to the base 260. In one embodiment, a laser 299 is used to heat a portion of the top cover 210 which heats the under lying solder preform seal to a temperature that re-flows the solder preform seal 220, soldering the top 210 to the base 260. In one embodiment, the solder seal is contained within a solder channel formed between the top cover 210 and the base 260. A description of the solder channel is provided below.

It is appreciated that the solder preform seal could also be deposited on the base 260. However, depositing the solder preform to the top cover reduces the heat required to melt the solder preform seal because thermal conductivity from the top cover to the solder preform is greater when the solder preform is in direct contact with the cover.

In one embodiment, a plurality of lasers 299 are used to heat portions of the top cover 210. For example, a plurality of lasers 299 can be directed at a single point on the cover 210 and travel around the perimeter of the cover 210. In another embodiment, multiple lasers 299 are used to heat more than one portion of the top cover 210 simultaneously such that multiple portions of the solder seal 220 are re-flowed simultaneously. For example, two lasers can start at opposing sides and work around the perimeter of the top 210 in opposite directions until the entire perimeter is heated.

Figure 3:
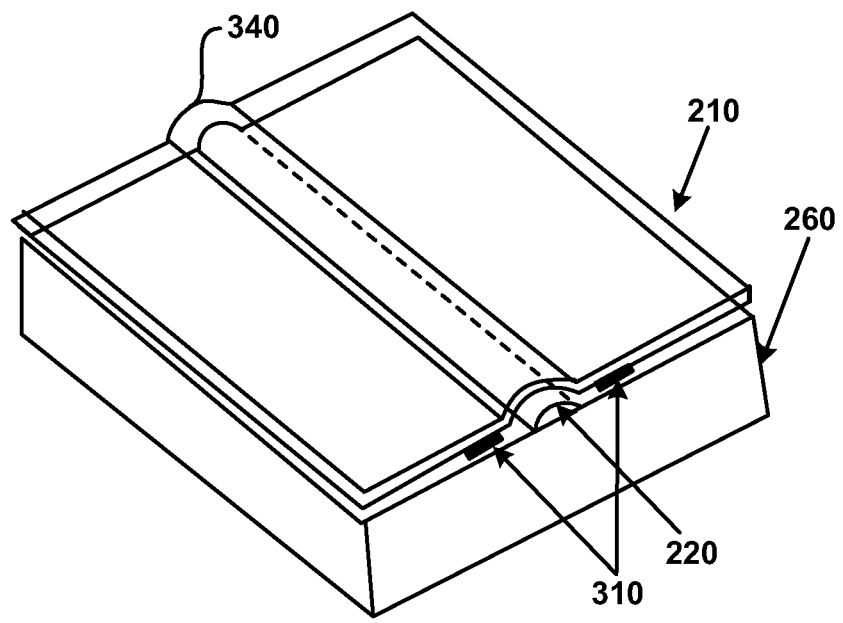
FIG. 3 is a cross sectional view of an exemplary disk drive assembly including a solder preform in accordance with embodiments of the present invention.

FIG. 3 is a cross sectional view of an exemplary disk drive assembly including a solder preform seal 220 in accordance with embodiments of the present invention. As stated above, in one embodiment, a solder channel 340 is used to contain the solder seal 220. In one embodiment, the solder channel 340 is formed in the top cover 210. For example, the solder channel is stamped or machined into the top cover 210. However, it is appreciated that the solder channel could be also formed in the base 260 or partially in the base 260 and partially in the cover 210.

In one embodiment, the cross-sectional area of the solder preform seal 220 is similar to the cross sectional area of the solder channel 340. As stated above, the solder channel can be stamped and/or machined in either the base 260 or the cover 210. For purposes of clarity and brevity, the solder channel 340 is shown in the cover 210. Having similar cross sectional areas ensures the solder can be completely contained within the solder channel 240. Having similar cross sectional areas also ensures the solder seal 220 completely fills the solder channel 340 when heated and re-flowed.

In one embodiment, the solder preform seal 220 is a similar shape of the solder channel 340. In this embodiment, the solder channel 340 comes in contact with the solder seal 220 on the base 260 when the cover 210 is positioned on the base 260. Since the solder seal 220 is in direct contact with the top cover 210, heating the top cover 210 also heats the solder seal 220. In this embodiment, heat is thermally conducted from the top cover 210 to the solder seal 220.

In one embodiment, a solder barrier (solder gasket) 310 is used to further control the flow of the solder seal 220. In one embodiment, the solder barrier 310 is positioned on both sides of the solder seal 220 to serve as a solder gasket which prevents solder from flowing out of the solder channel 340. It is appreciated that the solder barrier 310 could be located on the top cover 210, on the base 260 or a combination of both. In one embodiment the solder barrier 310 comprises copper, however other materials such as high-temperature polyamide could be used in accordance with embodiments of the present invention. It is also appreciated that a "gasket" can be formed by forming a channel that contains the solder when heated.

In one embodiment, the solder barrier 310 provides a double seal for the disk drive assembly. For example, when the solder preform seal 220 is heated and reflowed within the solder channel 340, a solder seal is formed at each of the solder barriers (gaskets), one of which is an inner seal and the other is an outer seal with respect to the hard disk drive enclosure.

Figure 4A:
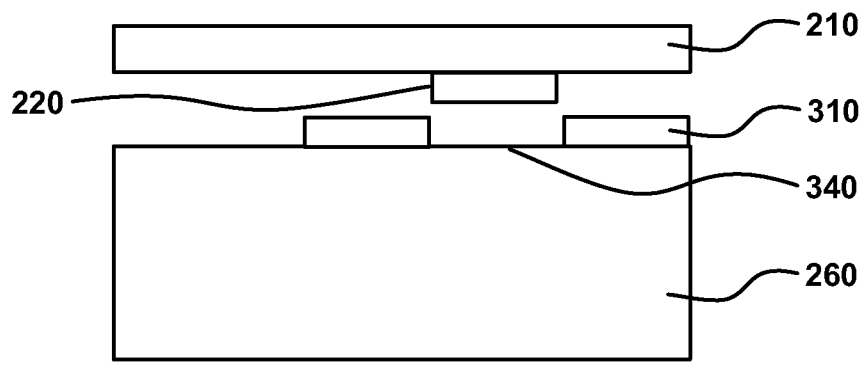
FIG. 4A is a cross sectional view of an exemplary disk drive assembly with solder preform on a top cover and a solder gasket on the base in accordance with embodiments of the present invention.

FIG. 4A is a cross sectional view of an exemplary disk drive assembly with a solder preform seal 220 on the top cover 210 and a solder gasket 310 on the base 260 in accordance with embodiments of the present invention. As stated above, the solder preform seal 220 can be formed on the disk drive components in any number of ways and configurations. As stated above, in one embodiment, the solder preform seal 220 can be formed on the base 260 while the solder channel is formed in the cover 210. However, it is also appreciated that the solder preform seal 220 could be formed on both the cover 210 and the base 260. The solder gasket 310 contains the solder when solder preform 220 is heated and reflowed. In one embodiment, the solder gaskets 310 form a solder channel 340.

Figure 4B:
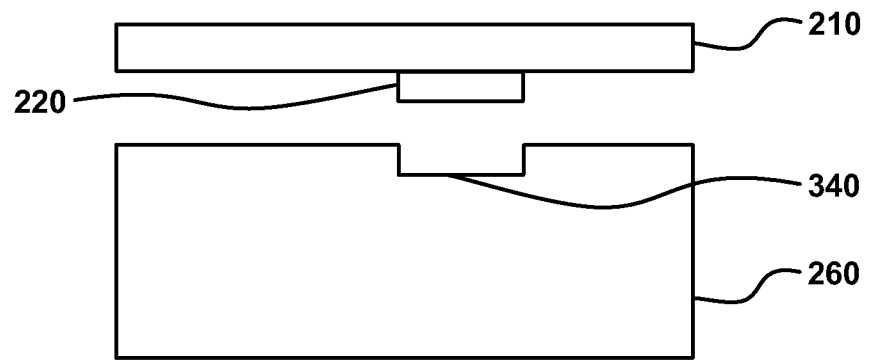
FIG. 4B is a cross sectional view of an exemplary disk drive assembly with solder preform on a top cover and a solder channel in the base in accordance with embodiments of the present invention.

FIG. 4B is a cross sectional view of an exemplary disk drive assembly with solder preform 220 on a top cover and a solder channel 340 in the base 260 in accordance with embodiments of the present invention. As stated above, the solder channel 340 may be formed as a groove machined or stamped in the disk drive components. FIG. 4B shows the solder channel 340 on the base and the solder preform 220 on the cover, however, it is appreciated that the solder preform seal could be formed within the solder channel in the base 260 or the cover 210. For example, the solder channel 340 could be formed and then filled with the solder preform 220. Once the cover and base are joined, the solder preform 220 is re-flowed to solder the base 260 to the top 210.

Figure 5:
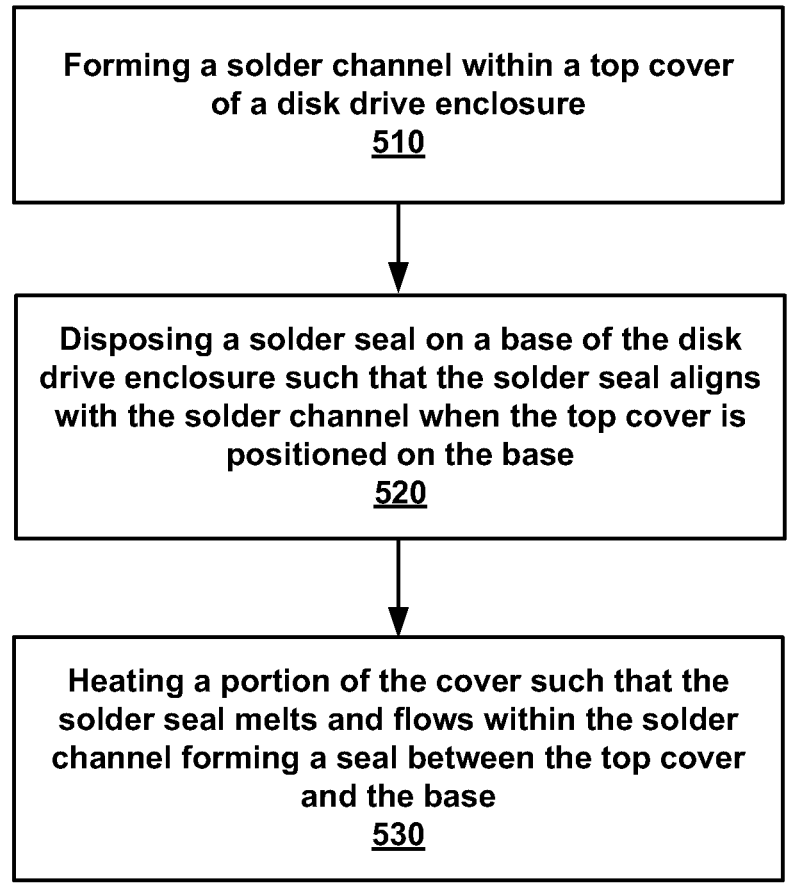
FIG. 5 is a flow diagram of an exemplary method for forming a seal for hermetically sealing a disk drive assembly in accordance with embodiments of the present invention.

FIG. 5 is a flow diagram of an exemplary method 500 for forming a seal for hermetically sealing a disk drive assembly in accordance with embodiments of the present invention.

At 510, method 500 includes forming a solder channel within a top cover of a disk drive enclosure. As stated above, the solder channel could also be formed in the base portion of the disk drive enclosure.

At 520, method 500 includes disposing a solder preform seal on a base portion of the disk drive enclosure such that the solder preform seal aligns with the solder channel when the top cover is positioned on the base. As stated above, in the case the solder channel is formed in the top cover, the solder seal is disposed on the base portion of the enclosure such that the top cover contacts the solder seal such that heat can be conducted through the top cover to the solder seal.

It is appreciated that a portion of the solder seal could be disposed on the top cover as well as a portion on the base of the enclosure. It is also appreciated that the solder channel and the solder preform may be formed on the same side. For example, the solder channel and the solder preform can be both formed on the top cover or both formed on the base.

In one embodiment of the invention, the shape of the solder preform seal is similar to the shape of the solder channel so that the solder seal completely fills the solder channel when heated and re-flowed. In one embodiment, a solder barrier (gasket) is disposed on both sides of the solder seal to prevent solder from flowing outside of the solder channel.

At 530, method 500 includes heating a portion of the top cover such that the solder preform seal melts and flows within the solder channel forming a solder seal between the top cover and the base. As stated above, in one embodiment of the invention, a laser is used to provide localized heat to the cover portion of the disk drive enclosure to solder the top cover to the base. However, it is appreciated that any number of devices could be used to heat the solder preform seal to a temperature that enables the solder seal to re-flow (e.g. melt) and solder the cover to the base.

Using a solder seal allows the top to be subsequently removed from the base without damaging either the top or the base. Furthermore, the solder seal of the present invention requires much less heat to seal than conventional welding techniques used to seal hard drive enclosures. The lower temperature required for soldering results in less damage to components of the hard disk drive assembly, as opposed to conventional welding where higher temperatures are needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for forming a seal for hermetically sealing a hard disk drive assembly, the method comprising:
    forming a solder channel on a face of a top cover or on a face of a base of a disk drive enclosure or on said face of said top cover and said face of said base;
    disposing a solder preform on a face opposing said channel or in said channel such that said solder preform is in direct contact with said face on which said solder channel is formed and aligns with said solder channel when said top cover is positioned on said base; and
    heating at least a portion of said top cover with a laser to melt said solder preform and to flow said solder preform within said solder channel.

2. The method of claim 1,
    wherein said heating includes heating simultaneously a plurality of portions of said top cover with a plurality of lasers to melt said solder preform and to flow said solder preform in a plurality of locations within said solder channel without melting said top cover or said base.

3. The method of claim 1, further comprising:
    disposing a solder containment barrier proximate each side of and on the same part as said solder channel to prevent said solder preform from flowing out of said solder channel when heated.

4. The method of claim 1,
    wherein said disposing includes disposing said solder preform in a pattern around the perimeter of said base.

5. The method of claim 1,
    wherein said forming includes forming said solder channel within said cover.

6. The method of claim 5,
    wherein said disposing includes disposing said solder preform on said base such that said solder preform aligns with said solder channel when said cover is positioned on said base.

7. The method of claim 6,
    wherein said disposing includes disposing said solder preform around the perimeter of said base.

8. The method of claim 1, wherein said forming includes forming said solder channel on a face of said base.

9. The method of claim 8, wherein said disposing includes disposing said solder preform around the perimeter of said cover.

10. The method of claim 1, wherein said solder channel and said solder preform have a substantially similar cross-sectional area.

11. A method for forming a seal for hermetically sealing a hard disk drive assembly, the method comprising:
- forming a solder channel on a face of a top cover of a disk drive enclosure;
- disposing a solder preform on a face of a base of said disk drive enclosure such that said solder preform is in direct contact with said top cover and aligns with said solder channel when said top cover is positioned on said base; and
- heating at least a portion of said cover with a plurality of lasers such that said solder preform melts and flows within said solder channel forming a solder seal between said top cover and said base.

12. The method of claim 11,
- wherein said heating includes heating a plurality of portions of said cover simultaneously with said plurality of lasers such that said solder preform flows in a plurality of locations within said solder channel of said hard disk drive assembly.

13. The method of claim 11, further comprising:
- disposing a solder containment barrier proximate each side of said solder channel to prevent said solder preform from flowing out of said solder channel when heated with said plurality of lasers.

14. The method of claim 11,
- wherein said disposing includes disposing said solder preform in a pattern around the perimeter of said base.

* * * * *